July 7, 1959
H. H. FINK
2,893,466
METHOD AND APPARATUS FOR MAKING CABLE
REINFORCED CONVEYOR BELTS
Filed Oct. 1, 1954
2 Sheets-Sheet 1
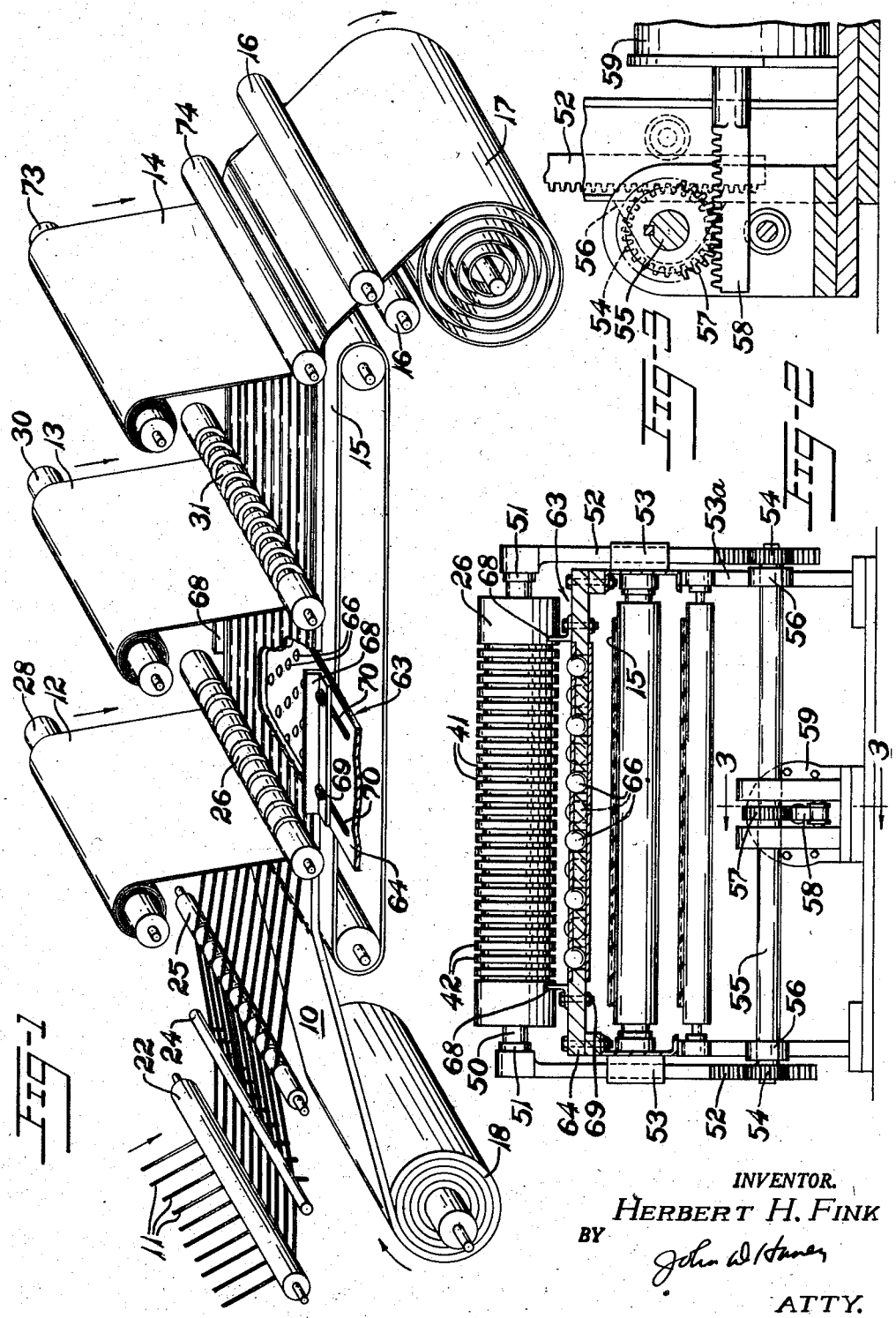
INVENTOR.
HERBERT H. FINK
BY
ATTY.

INVENTOR.
HERBERT H. FINK
BY
ATTY.

United States Patent Office 2,893,466
Patented July 7, 1959

2,893,466

METHOD AND APPARATUS FOR MAKING CABLE REINFORCED CONVEYOR BELTS

Herbert H. Fink, Akron, Ohio, assignor to The B. F. Goodrich Company, New York, N.Y., a corporation of New York Application October 1, 1954, Serial No. 459,707

3 Claims. (Cl. 154—4)

This invention relates to the manufacture of conveyor belts of elastomeric materials and having flexible, inextensible reinforcing members such as stranded steel cables extending longitudinally through the carcass of the belt.

In making a cable-reinforced conveyor belt prior to this invention, the usual procedure has been to arrange the cables in laterally-spaced, mutually parallel relation against a relatively thick sheet of unvulcanized rubber-like material referred to as the "base gum" which overlies a lamination of several rubber-covered fabric plies. The cables next have been covered with one or more sheets of unvulcanized rubber-like material referred to as "tie gum" and then this lamination has been passed through the bite of a pair of squeeze rolls having either smooth or corrugated peripheral pressure surfaces. The squeeze rolls advance the lamination forwardly and the pressure of the rolls has been utilized to embed the cables in the base gum and the tie gum. Thereafter any additionally desired fabric plies, and a surrounding rubber cover have been applied to complete assembly of the belt for vulcanization.

It has been found that even with the most careful workmanship, belts made by the foregoing method are often of poor quality in that after vulcanization the belts tend to have wave-like irregularities particularly in the center of the belts which prevent the belts from laying flat. Also, after vulcanization, certain of the cables are found to be irregularly spaced within the carcass and disarranged in generally sinusoidal or "snaked" patterns in the plane of the cables. These characteristics are objectionable because such belts do not track properly about the supporting pulleys in a conveyor system and because these belts tend to wear abnormally due to the uneven distribution of the tension loads among the several cables. These characteristics have been most prominent on belts having a width of more than about two feet.

It is a general object of this invention to provide for building longitudinally-reinforced belts in any width desired which are free of the foregoing objectionable characteristics. Briefly, this object is accomplished in accordance with this invention by enclosing the cables or other reinforcing members between the surrounding base gum and tie gum while maintaining the cables free from any substantial squeezing pressure in a direction laterally or radially of the cables. The invention additionally includes novel apparatus useful in practicing this method.

The principal cause of the foregoing objectionable characteristics is believed to have resulted from the deflection occurring in the center portions of the squeeze rolls as the carcass and cables passed between the squeeze rolls. In the prior method the squeeze rolls exert high pressure on the carcass in order to embed the cables properly in the base gum and to deform the tie gum between the cables. Apparently as a result of this pressure, there is sufficient deflection at the center of the squeeze rolls that the pressure exerted by the rolls on the center portion of the carcass is considerably less than the pressure near the edges. Accordingly, the squeeze rolls tend to feed the cables near the center portions of the belt carcass forwardly at a faster rate than the edges so that in any particular length of the belt, the cables near the center may be slightly longer than those nearer the edges thereby causing the wave-like irregularities or buckling in the belt faces and/or snaking of the cables. Some of the irregularities in the spacing of the cables is also apparently due to lateral displacement of the cables caused by the pressure of the squeeze rolls as the tie gum is forced into the spaces between them.

According to this invention, the tie gum is adhered to the base gum by exerting adhering pressure directly to and only on the portion of the tie gum intermediate the cables while maintaining the cables free of squeezing pressure that tends to shift them laterally and in the preferred embodiment of the invention little or no force is applied to the cables radially on the cables. The pressure required to accomplish this is very slight compared with the pressure exerted by the squeeze rolls in the prior method. The operation of adhering the tie gum to the base gum is preferably accomplished by equipment which includes a stitching member which is supported transversely of the cables and is operable to adhere the tie gum to the base gum as the tie gum is progressively laid over the carcass. The stitching member is preferably in the form of a roller with a series of endless circumferential grooves formed in the periphery of the roller, the grooves dividing the roller into a series of narrow fins which engage the tie gum in the spaces between the cables. Several stitching members may be utilized where it is desired to apply the tie gum in several separate layers over the cables. Means independent of the stitching members is employed to advance the carcass forwardly during the step of applying the tie gum. In the preferred apparatus, means is provided for automatically aligning the carcass with the stitching members as the tie gum is applied, and also means is provided for adjusting the pressure exerted by the stitching member against the tie gum.

The method of making belts provided by this invention will be further described with reference to the accompanying drawings which show in detail the steps of making a typical belt in accordance with this method, and which additionally show the preferred apparatus for practicing this invention.

In the drawings:

Fig. 1 is a view in oblique projection schematically illustrating suitable equipment for assembling the carcass portion of a typical conveyor belt having reinforcing cables;

Fig. 2 is an elevational view showing details of a preferred means for supporting one of the stitching members for folding sheet material around the cables;

Fig. 3 is a detail view of a portion of the mechanism of Fig. 2, on the line 3—3 of Fig. 2;

Figure 4:
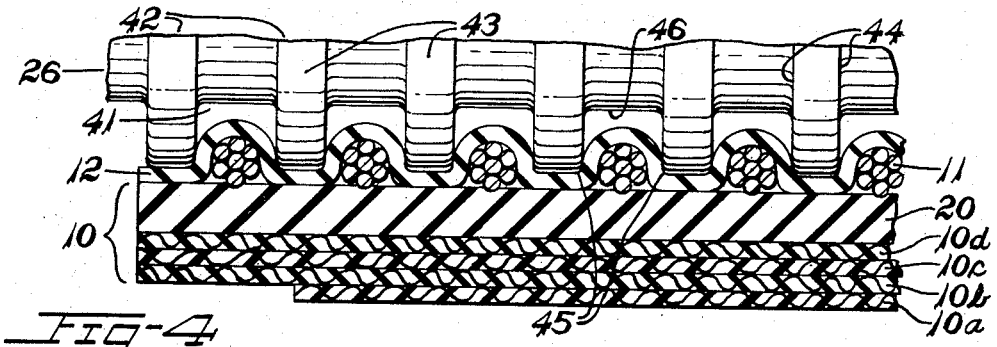
Fig. 4 is an enlarged cross-sectional view of a portion of the belt carcass near one edge showing the application of a first sheet of tie gum.

In the belt-building apparatus shown in Fig. 1, a base carcass stock 10, a plurality of cables 11, unvulcanized rubber tie gum stock 12 and 13, and rubber-covered fabric ply stock 14 are fed continuously to a moving conveyor belt 15 which serves as a building table on which these materials are progressively superimposed on each other. After assembly, the carcass passes through the bite of a pair of rolls 16 and then to a windup roll 17 shown at the right end of the conveyor 15. The rolls 16 frictionally engage the opposite faces of the carcass and cooperate with the movement of the conveyor and the windup roll to feed the carcass toward the windup roll and to smooth out wrinkles or the like.

The base carcass stock 10 for the particular belt selected for illustration consists of a lamination of four plies of a conventional rubber-impregnated belt fabric designated 10a, 10b, 10c and 10d (see Figs. 4–7) and a relatively thick sheet of unvulcanized rubber 20 which is the base gum against which the cables are subsequently arranged. This stock is preferably prepared prior to being delivered to the equipment of Fig. 1 and is fed to the conveyor 15 from a roll 18. (Insofar as the practice of this invention is concerned, the plies 10a etc. and base gum 20 may be assembled together concurrently with the step of laying the cables.) The stock 10 is fed to the conveyor with the base gum 20 directed upwardly to receive the cables 11 on its upper surface.

The cables 11 are guided from their respective storage reels (not shown) under a guide roll 22 which orients the cables in a common plane substantially parallel to the base carcass stock 10, and then they are guided through a comb 24 and over a grooved roll 25 to adjust spacing between the cables to the required distance apart. Thereafter the cables are directed under a grooved stitching roller 26 and are laid upon the base gum 20.

As the cables 11 are laid on the base gum, they are simultaneously covered by the first layer of tie gum 12 which in this embodiment of the invention is in the form of a comparatively thin sheet of unvulcanized rubber extending over all of the cables. This sheet is fed downwardly from a supply roll 28 and under the stitching roller 26 which operates to fold the tie gum around the upper portion of each of the cables and to adhere it to the base gum intermediate the cables but without applying any squeezing pressure to the cables. The resulting lamination is thereafter covered by a second layer of tie gum 13 which, like tie gum 12, is also in the form of a comparatively thin sheet of unvulcanized rubber and is fed from a supply roll 30 under a stitching roller 31 where it is laid over the first layer of tie gum 12. The stitching roller 31 functions similarly to the roller 26 to adhere the portions of the second tie gum intermediate the cables to the first layer of tie gum.

Figure 5:
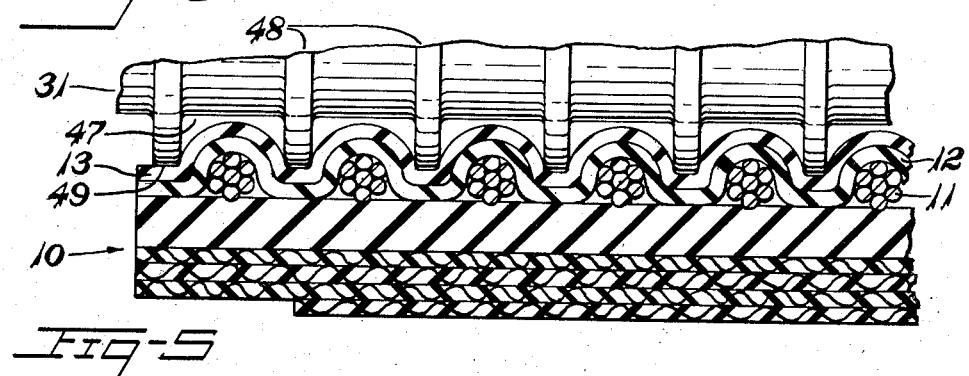
Fig. 5 is a view similar to Fig. 4 but showing the application of a second sheet of tie gum.
Figure 6:
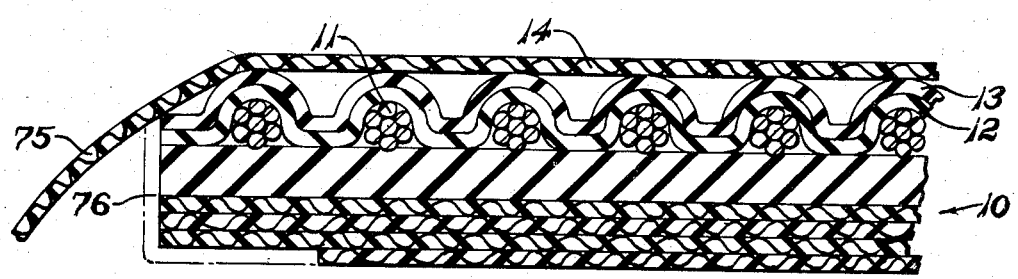
Fig. 6 is another view similar to Fig. 4 but showing the application of a fabric ply overlying the tie-gum.

Details of the shape and the mode of operation of the rollers 26 and 31 may be noted in Figs. 4 and 5, respectively. The roller 26 is supported transversely across the conveyor for rotation on an axis perpendicular to the cables 11 and parallel to the plane of the cables. It is formed with a plurality of endless parallel circumferential grooves 41 in it which divide the periphery of the roller into a plurality of radially-projecting annular fins 42 which are spaced apart axially along the roller a distance equal to the distance between the cables. Each fin has a peripheral surface 43 which is substantially cylindrical and a pair of parallel radial faces 44 which merge with the peripheral surface 43 to form slightly rounded corners 45. In the position in which the roller is supported above the conveyor, the fins 42 are aligned with the teeth of the comb 24 so that each cable is guided through its respective groove 41 as the stock 10 passes under the roller. Each fin 42 thus projects between the cables but has its peripheral surface 43 a slight distance above the base gum 20 of the carcass stock. Each fin is substantially narrower than the distance between the cables and the radial extent of the faces 44 is such that the body portions 46 of the roller forming the bottom of the grooves 41 are spaced away from the upper side of the cables to avoid contact with the cables.

In view of the shape and the position of the roller 26 it may be seen that as the tie gum sheet 12 is fed under roller 26, the radially-projecting fins 42 will progressively engage the areas of the sheet between the cables and pleat or tuck these areas into the spaces between the cables, and the peripheral surface 43 of each fin will press its respective portions of the sheet into adhering relation with the base gum 20 underlying the cables. The width of each fin is preferably equal to the distance from the side of one cable to the side of the next cable, less twice the thickness of the sheet 12 so that the fins fold the sheet 12 closely against the sides of the cables. However no portion of the roller 26 exerts any appreciable lateral pressure on the cables other than that required to guide the cables so that they are straight and parallel. It may be noted that the portions 46 of the roller are a sufficient distance from the peripheral surface 43 of the fins to avoid contact between the sheet 12 and the surface 46. The sheet 12 is thereby folded about each cable without being thinned substantially along the top of the cable. To some extent the roller 26 may function to maintain the proper spacing between the cables after they have moved beyond the comb 24 and the grooved roller 25 and to this extent there may be some slight lateral pressure of the cables against the fins but unless the cables are not uniformly spaced as they pass under roller 25, the sheet 12 is applied without any lateral pressure on the cables.

The roller 31 functions to apply the second sheet of tie gum 13 in the same manner that the roller 26 forms the tie gum 12 around the cables. The roller 31 as shown in Fig. 5, is provided with a plurality of endless circumferential grooves 47 which divide the surface of the roller into a series of axially-spaced, radially-projecting annular fins 48 slightly narrower than the fins 42 of roller 26. The roller 31 is supported above the table on a rotational axis parallel to the axis of roller 26 with the fins 48 aligned with the fins 42 of roller 26. The roller 31 is in all respects identical with roller 26 except that its fins 48 are narrower than the fins 42 by an amount equal to about twice the thickness of the tie gum 13. The fins 48 project between the cables 11 to fold the sheet 13 over the sheet 12 on cables and each fin has a peripheral surface 49 which presses its respective area of the sheet 13 between the cables into adherence with the corresponding portions of the sheet 12. Like the operation of roller 26, no portion of roller 31 exerts any substantial lateral or radial pressure against the cables.

Fig. 2 illustrates a preferred means for mounting the roller 26 above the conveyor and although not shown, the roller 31 may be mounted in a similar structure. The roller 26 is rigidly mounted on a shaft 50, the ends of which are journaled in bearings 51 at opposite sides of the conveyor. Each of the bearings 51 is fastened to the upper end of a toothed rack 52 which is slidable vertically in a guide 53 secured to the sides of the conveyor frame structure 53a. To move the racks 52 in their respective guides, each rack is meshed with a pinion 54 mounted at each end of a shaft 55 which extends transversely under the conveyor frame structure and is journaled in suitable bearings 56 on this frame 53a. The shaft 55 has an additional pinion 57 mounted on it intermediate the pinions 54 which is meshed with a horizontal rack 58 operated by an air cylinder 59 to rotate the shaft 55 (see Fig. 3). Thus, the roller 26 may be adjusted vertically with its axis parallel to the table to adjust its position above the table relative to the carcass In order to maintain the belt carcass so that the cables will be positioned accurately relative to the grooves of the stitching rollers 26 and 31 as the tie gum sheets 12 and 13 are applied, an aligning mechanism 63 is provided between the stitching rollers 26 and 31 as shown in Fig. 1. The aligning mechanism 63 is formed with a flat plank 64 (see Fig. 2) through which a series of rotatable spherical-shaped metal balls 66 protrude to support the belt carcass intermediate the stitching rollers. Additionally, the aligning mechanism includes a pair of upright side rails 68 which are adjustably secured to the plank 64 by bolts 69 in slots 70 so that the distance between the rails is equal to the width of the carcass. As the belt carcass passes beyond the roller 26, it is trained over the plank 64 and thus temporarily removed from the conveyor 15 which extends under the plank 64. The conveyor again receives the carcass adjacent the stitching roller 31. The guide rails 68 contact the longitudinal edges of the carcass and prevent it from shifting laterally to displace the cables from alignment with the rollers 26 and 31. The balls 66 facilitate the movement of a wide, heavy carcass across the plank 64 and permit it to be easily shifted laterally by the guide rails 68 if necessary to maintain the desired alignment.

After the sheets 12 and 13 are positioned by the rollers 26 and 31, respectively, the fabric ply 14 is fed from a suitable supply roll 73 downwardly under a smooth-surfaced roller 74 which positions this ply over the sheet 13. The fabric of ply 14 is normally wider than the carcass plies 10a, 10b, 10c and 10d and is applied over the sheet 13 with its margins 75 (see Fig. 6) projecting beyond the margins 76 of the carcass stock 10. In subsequent stages of the construction, the margins 75 are folded downwardly around the edges of the belt and then inwardly against the edge of the first ply 10 of the base carcass stock as indicated by the chain-dotted lines in Fig. 6 by suitable conventional folding mechanism. The ply 14 preferably consists of rubber-impregnated cords extending transversely across the carcass.

After the foregoing materials are assembled in the manner described, the lamination of them passes between a pair of rolls 16 which serve to smooth any wrinkles or the like from the various plies. These rolls exert some squeezing pressure on the assembly sufficient to frictionally engage the carcass and thereby cooperate with the conveyor 15 and the windup 17 in advancing the carcass through the assembly stations. However the pressure exerted by these rolls is much less than was used in the prior manufacturing methods and since the tie gum sheets 12 and 13 have been previously folded about the cables, the squeeze rolls 16 are not required to perform this function. Further, the tie gum anchors the cables in proper position as the carcass passes between the rolls 16 so that the pressure of the rolls does not tend to disrupt the spacing of the cables.

Figure 7:
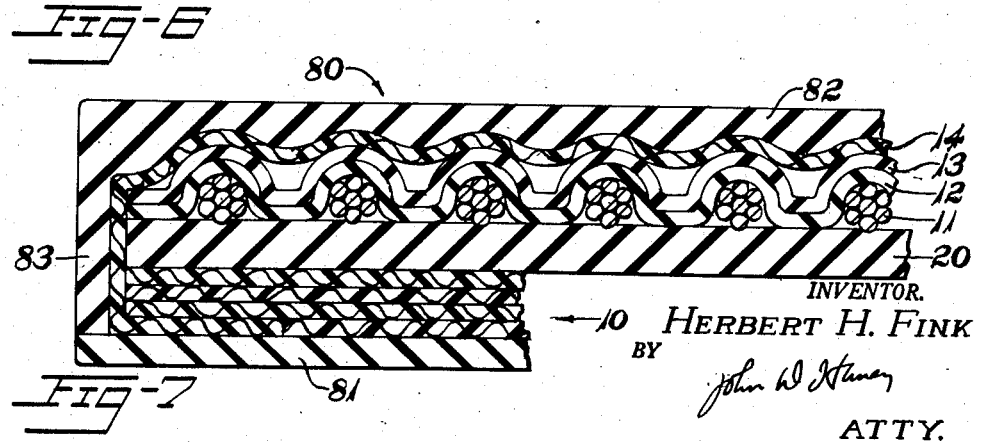
Fig. 7 is a cross-sectional view of the belt carcass with the outer rubber cover surrounding it but before it is vulcanized.

Fig. 7 shows a cross-sectional view of the portion of the belt close to one edge after the surrounding outer rubber cover 80 has been applied around the carcass. The cover 80 is normally applied to the carcass materials by equipment not illustrated in the drawings after the carcass is built in the manner described in the foregoing. The cover 80 includes a relatively thick bottom rubber sheet 81 to form the pulley-contacting side of the belt, and an upper rubber sheet 82 with margins 83 which are folded downwardly around the edges of the carcass to abut the edges of the bottom rubber sheet 81. These belts are normally vulcanized in large platen presses under sufficient pressure and at a temperature to cause a flow of the rubber material into the voids between the cables and to fuse all of the plies and rubber materials of the carcass into an integral structure.

It should be understood that the various types of carcass plies and their arrangement in the belt as described in the foregoing represent a typical belt construction reinforced by cables. Other type plies made of elastomeric materials commonly used in belting and arrangements of them may be assembled with the cables in accordance with the principles of this invention within the scope of the appended claims.

I claim:

1. The method of building a flexible cable-reinforced conveyor belt which comprises assembling reinforcing cables in laterally spaced parallel relation to each other between a sheet of elastomeric belt material and a strip of belt carcass material, exerting localized pressure on said sheet in zones thereof between adjacent cables while maintaining the cables and the portion of the sheet overlying said cables substantially free of pressure to corrugate said sheet about the cables and to engage said zones of the sheet with the opposing portions of said strip thereafter covering the assembly of said sheets and cables with elastomeric belt covering material, and finally fusing the resulting assembly into an integral finished belt.

2. The method of building a flexible cable-reinforced conveyor belt which comprises assembling reinforcing cables in laterally spaced parallel relation to each other between a sheet of elastomeric belt material and a strip of belt carcass material, exerting localized pressure on said sheet in zones thereof between adjacent cables while maintaining the cables and the portion of the sheet overlying said cables substantially free of pressure to corrugate said sheet about the cables and to engage said zones of the sheet with the opposing portions of said strip, thereafter covering said sheet with a fabric ply, thereafter smoothing and compressing the resulting assembly including said fabric ply, then covering the resulting assembly including said fabric ply with elastomeric belt cover material, and finally fusing the belt carcass so assembled into an integral finished belt.

3. The method of building a flexible cable-reinforced conveyor belt which comprises continuously guiding a plurality of reinforcing cables to a position in which they are in laterally spaced parallel relation to each other on a strip of elastomeric belt carcass material, continuously guiding a sheet of elastomeric belt material against said cables to cover said cables, progressively advancing the resulting assembly of said strip, sheet and cables and progressively exerting localized pressure on zones of said sheet between adjacent cables while maintaining the cables and the portions of said sheet overlying said cables substantially free of pressure to corrugate said sheet about portions of said strip, thereafter progressively covering the resulting assembly with a fabric ply, thereafter progressively smoothing and compressing the resulting assembly including said ply, then covering the resulting assembly including said ply with elastomeric belt cover material, and finally fusing the belt carcass so assembled into an integral finished belt.

References Cited in the file of this patent

UNITED STATES PATENTS

| | | |
|---|---|---|
| 1,929,903 | Schindler | Oct. 10, 1933 |
| 1,931,309 | Thompson | Oct. 17, 1933 |
| 1,977,108 | Arnberg | Oct. 16, 1934 |
| 2,061,922 | Ross | Nov. 24, 1936 |
| 2,197,569 | Kimmich | Apr. 16, 1940 |
| 2,239,635 | Walton | Apr. 22, 1941 |
| 2,707,367 | Pullman | May 3, 1955 |
| 2,767,113 | Bower | Oct. 16, 1956 |

UNITED STATES PATENT OFFICE

CERTIFICATE OF CORRECTION

Patent No. 2,893,466                                             July 7, 1959

Herbert H. Fink

It is hereby certified that error appears in the printed specification of the above numbered patent requiring correction and that the said Letters Patent should read as corrected below.

Column 4, line 63, after "carcass" insert -- stock 10. --; column 6, line 44, after "about" insert -- the cables and to engage said zones with the opposing --.

Signed and sealed this 5th day of January 1960.

(SEAL)
Attest:

KARL H. AXLINE

Attesting Officer

ROBERT C. WATSON
Commissioner of Patents